United States Patent Office 3,518,570
Patented June 30, 1970

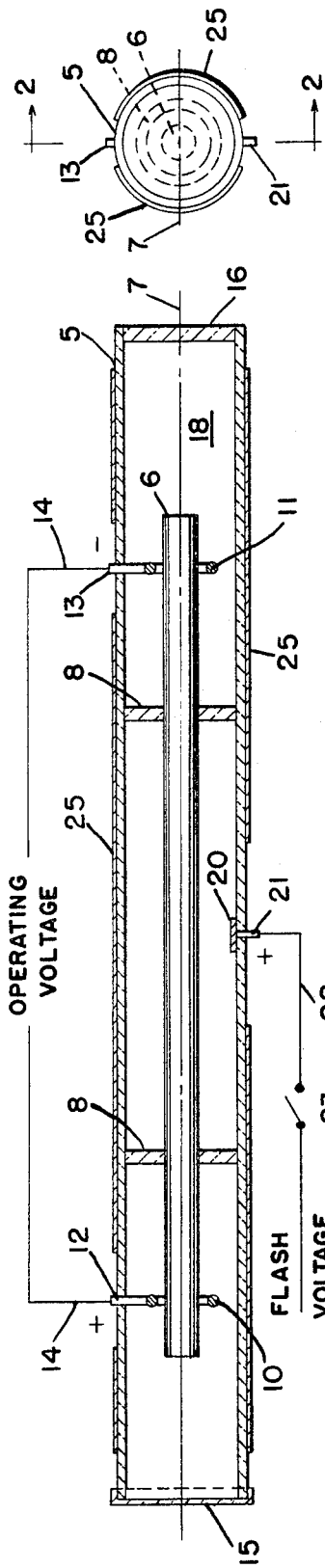

3,518,570
LASER EXCITER SYSTEM
William A. Dittrich, Willow Grove, Pa., assignor to the United States of America as represented by the Secretary of the Army
Continuation of application Ser. No. 357,335, Apr. 3, 1964. This application June 2, 1969, Ser. No. 831,268
Int. Cl. H01s *3/05*
U.S. Cl. 331—94.5                                    1 Claim

ABSTRACT OF THE DISCLOSURE

A solid-rod laser crystal element is located in a sealed translucent flash tube which provides excitation means and a resonant cavity for and surrounding said element. A charge of ionizable gas in the flash tube around the crystal element and a pair of ring-like operating-voltage electrodes surrounding the crystal element are provided in the flash tube, said electrodes being arranged in spaced relation to each other along the crystal element and connected with external insulated supply terminals for receiving operating voltage. A light-reflective electrically-conductive coating is provided on the outer surface of the flash tube and connected as a trigger element to receive a high flash voltage with respect to one of the inner electrodes, thereby to flash the charge and permit ionizing current to flow therethrough between the electrodes and to reflect light inwardly from the outer surface. One end of the flash tube is provided with a lens or window for translating the light output from the laser element externally of the casing in a beam.

---

This application is a continuation of application Ser. No. 357,335, filed Apr. 3, 1964.

The invention described herein may be manufactured and used by or for the Government for governmental purposes without the payment to me of any royalty thereon.

The present invention relates to optical masers or lasers, and more particularly to exciter systems for solid-state lasers of the crystal rod type.

It is a primary object of this invention to provide an improved unitary exciter system of reduced size and increased efficiency for lasers of that type.

It is also an object of this invention to provide an improved solid-state laser for producing coherent light of relatively high intensity from a crystal body or rod through the application of concentrated light energy thereto in a compact unitary structure with a high degree of efficiency.

It is a further object of the invention to provide an improved laser exciter system of cylindrical and compact construction for and in connection with a central coherent-light producing rod or body to effect a high degree of light concentration thereon and higher efficiency in operation.

It is a still further object of the invention to provide an improved laser exciter system for the production of coherent light from a crystal body in an integral-lens exciter-lamp crystal-cavity configuration or structure for higher efficiency.

In producing coherent light with a solid-state laser, it is necessary to excite or pump the entire crystal body or rod by the application of light energy thereto of the proper wavelength. It is desirable to get as much of the light emitted by the exciter into the crystal, as possible, to provide maximum efficiency. In prior known laser structures, a helical flash tube is wrapped around the crystal rod or coherent-light producing element, or an elliptical reflecting cavity, in which the rod is at one focus point of the ellipse and a cylindrical exciter lamp at the other, may be provided. The latter construction is more efficient but cumbersome and requires more components. The normal cavity may be several inches in diameter for a one-quarter-inch diameter rod and approximately the length of the rod used, which may be as much as twelve inches.

In the exciter system of the present invention, it has been found that the laser body or rod may be placed inside of the flash tube to make a unitary structure of reduced size and increased efficiency. The rod as above can be placed in a tube of less than one inch in diameter, and slightly longer than the rod used. One end of the tube may contain an optically-flat glass for the transmission of parallel coherent light energy radiation, or a lens system, normally external to the cavity, if divergent or convergent radiation is desired. The exterior surface of the tube wall may be provided with reflector means for the internal light energy. Thus it may be coated or covered by a layer or film of silver or similar light-reflecting material so that all of the light emitted by the flash tube may be concentrated on the central laser rod inside.

The conventional flash tube for laser excitation makes use of a helical wire or conductor on the outside of the tube to cause ionization of the gas inside when an extremely high flash voltage (30–60 kv.) is applied between it and one of the end electrodes of the tube. The initial ionization of the gas in the tube permits a voltage breakdown between the two end electrodes. Upon firing and resultant current flow through the ionized gas, a large quantity of energy may be impressed upon the gas from an external energy-storage capacitor bank. In the system of the present invention, the reflector means used to reflect light energy back on the crystal, if of silver or other electrically-conductive material, may be used as the trigger electrode instead of a helical wire or internal electrode, as will be seen.

In addition to concentrating a high percentage of light on the coherent-light producing element or rod, and thus effecting a higher or improved efficiency, a gas-discharge lamp or flash-tube system for excitation of an optical maser or a laser element therein, in accordance with the invention, is relatively small in size and rugged, since all components may be molded into one cylindrical structure. Thus it offers improved efficiency and reduced size in comparison with conventional helical lamps and systems in which a reflector is used to focus light from a lamp onto the laser element or rod.

The invention will, however, be better understood from the following description of certain embodiments thereof, when considered with reference to the accompanying drawing, and its scope is pointed out in the appended claim.

In the drawing, FIG. 1 is an end view of an optical maser or laser including an excitation system embodying the invention, FIG. 2 is a longitudinal view, in elevation and in section viewed on the line 2—2 of FIG. 1, showing further details thereof in accordance with the invention, FIG. 3 is a portion of the sectional longitudinal view of FIG. 2, showing a modification in the construction thereof in accordance with the invention, and FIG. 4 is also a portion of the sectional view of FIG. 2 showing a further modification in the construction thereof in accordance with the invention.

Referring to the drawing, wherein like parts and elements are designated by like reference numerals throughout the various figures, and referring particularly to FIGS. 1 and 2, a cylinder or cylindrical outer casing 5 of glass or like electrically non-conducting translucent material concentrically surrounds and encloses an elongated rod or crystal body 6 positioned in and extending along its axis 7. The rod is of a material capable of producing laser action, such as a synthetic ruby crystal, and is held in position and supported from the inner cylindrical wall of the casing by longitudinally spaced supporting rings 8, also of glass or other electrically non-conducting material.

Two end electrodes 10 and 11 are inserted in the casing and supported thereby from terminals 12 and 13, respectively, which extend through the casing wall for connection with a supply circuit, indicated by the leads 14, by which the operating voltage is applied. The electrodes 10 and 11 may be ring-shaped, as indicated, and surround the rod 6 near the ends thereof and out of contact therewith. In other cases they may be disc-shaped or otherwise as desired so long as the emission of radiation is not interfered with by the position of either electrode.

The left end of the cylinder, as viewed in the drawing FIG. 2, may be regarded as the rear end, and is closed and sealed by a suitable end cover 15. This may be metallic as indicated and at the opposite forward or front end, a lens 16 is provided and sealed in. This may be of any suitable construction to control the light energy output. Here it may be considered to be an optically-flat glass for the transmission of parallel coherent radiation from the laser rod 6 when excited. The front end may, in a similar manner, also contain any suitable lens system 17, as indicated in FIG. 3, which is normally external to the cavity or interior chamber 18 of the casing, and where divergent or convergent radiation is desired.

The tube may be filled with an ionizing gas, such as xenon for example, and which will produce intense light when ionized by an electrical discharge therethrough between the operating electrodes 10 and 11. The ionization is initiated or triggered by means of a trigger or firing electrode 20 connected in the supply circuit through a terminal 21 and a connection lead 22, with suitable switch means 23 for momentary energization with respect to one of the operating electrodes, such as the electrode 11 in the present example. A relatively high positive voltage thus applied to the firing terminal or electrode 20 with respect to the terminal or electrode 11, which is here assumed to be the negative electrode, causes ionization of the gas in the cylinder or cavity and a breakdown in the space between the end electrodes 10 and 11. Current flows and a large quantity of energy is impressed upon the gas from the supply circuit 14 to produce light which is thus applied directly to the laser crystal or rod to excite it into strong active radiation through the lens or lens system.

The outer surface of the casing or cylinder 5 is covered by an optically-reflective coating, layer or film 25, such as a deposited film or a sheet of silver for example, for reflecting radiating light or light energy back to the laser crystal or rod 6 for higher efficiency of operation. The added concentration of light and energy on the coherent-light producing device or rod causes a high percentage of the available light to be used effectively for exciting the crystal than has before been attainable. Substantially all available light can thus be concentrated on the crystal in this compact unitary structure, which may be less than one inch in diameter with a one-quarter inch rod.

When the optically reflective coating or film 25 is of electrically-conductive material, such as silver, it may be used as the firing or triggering electrodal means, as indicated in FIG. 4, where the electrode 20 is eliminated and the firing circuit lead 22 is connected with a terminal 26 on the coating. In all forms of the invention, it is necessary to provide insulating clearance between the electrode terminals 12, 13 and 26 when the reflective surface film or coating is electrically conductive. This clearance is indicated in the drawing and its width or size is determined by the magnitudes of the applied voltages on the electrode terminals in any case, as is understood.

From the foregoing description it will be seen that the laser crystal or rod is placed directly in a flash-tube which provides the laser cavity. Thus it is directly in the light producing medium and area. The optically reflective coating completes the light concentration on the crystal for maximum efficiency of operation, with reduced size and a unitary compact structure.

The effectively integral lens-lamp-cavity configuration for higher efficiency, the use of the reflective coating on the lamp means to concentrate light energy into the crystal or coherent-light producing means, and the use of a conductive coating additionally as a trigger electrode to initiate the discharge and laser action, are features of this improved exciter system not previously available for use.

What is claimed is:
1. A laser exciter system, comprising:
a solid-state laser rod element;
a chamber for said element including an outer sealed tubular casing of translucent material surrounding said element in spaced coaxial relation therewith;
an ionizing gaseous charge within said casing directly in contact with and surrounding said element;
an outer electrically-conductive and optically-reflective coating on said casing for applying flash to said charge and for reflecting light emitted thereby upon the luminescence thereof;
only one pair of ring-like electrodes positioned within said casing and spaced directly about and surrounding element inwardly of the ends thereof for affecting said luminescence in conjunction with said coating by providing operating voltage to said charge; and
an optically flat glass at one end of said casing and at substantially right angles to the longitudinal axis of said element for translating a beam of parallel coherent light energy radiation from said rod element externally of said casing after the luminescence of said charge.

References Cited
UNITED STATES PATENTS

| | | |
|---|---|---|
| 3,164,782 | 1/1965 | Ordway. |
| 3,166,673 | 1/1965 | Vickery et al. |
| 3,353,115 | 11/1967 | Maiman. |
| 3,448,403 | 6/1969 | Vislocky _____ 331—94.5 |

OTHER REFERENCES

Shinoda, G., et al., "Light Source System for Ruby Laser," Japanese Journal of Applied Physics, vol. 1, No. 6, December 1962, pp. 364–365.

ROY LAKE, Primary Examiner

T. MAJOR, Assistant Examiner